Aug. 22, 1961 H. GRÖTTRUP 2,997,541

CODE CONTRACTING METHOD

Filed Feb. 7, 1957 3 Sheets-Sheet 1

INVENTOR
H. GRÖTTRUP

BY [signature]

ATTORNEY

INVENTOR
H. GRÖTTRUP
BY
[signature]
ATTORNEY

INVENTOR
H. GRÖTTRUP
BY
ATTORNEY 2,997,541

CODE CONTRACTING METHOD

Helmut Gröttrup, Birkenfeld, Wurttemberg, Germany, assignor to International Standard Electric Corporation, New York, N.Y., a corporation of Delaware Filed Feb. 7, 1957, Ser. No. 638,865
Claims priority, application Germany Feb. 8, 1956
6 Claims. (Cl. 178—26)

From the fields of teleprinter engineering it is well-known that a code can be extended when the number of symbols to be transmitted exceeds the number of symbols which are normally to be represented within this code. The most well-known example in this respect is the letter-figure shift as employed in modern teleprinting systems.

By employing teleprinter-like methods for automatizing office processes, or when applying automation to other fields, it recently has been often the case that messages have to be transmitted by a code which comprises less symbols than the code is capable of representing. The most well-known case in this respect is the transmission of messages merely consisting of figures, by means of the normal five-unit code as used in the teleprinting technique. The employment of the five-unit code, permitting the transmission of 32 different symbols, for the transmission of merely the 10 different symbols for representing the ten decimal digits, actually is a waste. On the other hand it is hardly possible to design the existing transmission facilities for the transmission of figures only, that is, to operate with a code that is adapted to this specific purpose only.

The invention is based on the problem of providing a method for the transmission of messages, represented by a given code, and which messages are composed of symbols (such as letters, figures, signs, or the like), but whereby the messages are compiled by less symbols than the code would be capable of representing, and in which method the aforementioned waste is avoided. In accordance with the invention groups of symbols of the messages to be transmitted are assembled or contracted and converted into smaller groups of symbols of the same code, are then transmitted in this form and received, and are then restored to the original form.

Such a code contraction, when the transmission is effected over one channel, results in a saving of time, whereas in the case of a transmission in parallel representations via different channels there will result a saving in the number of the transmitting channels.

Figure 1:
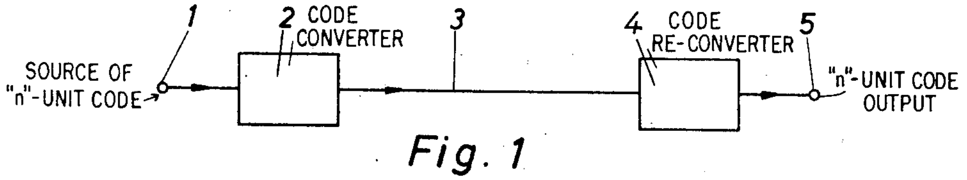
Figure 2:
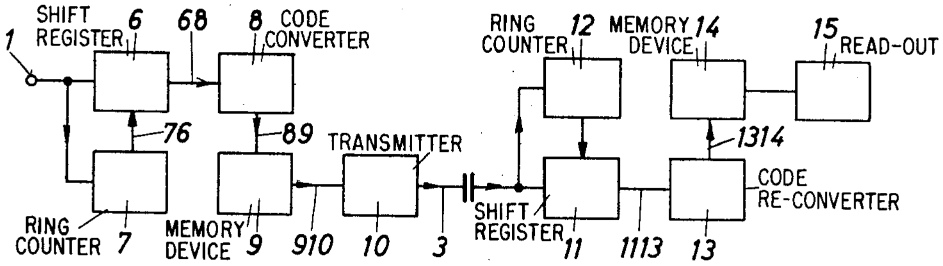

The invention, as well as further advantages thereof, will be described in particular with reference to the exemplified embodiments shown in FIGS. 1 to 4 of the accompanying drawings, in which:

FIG. 1 shows the principal structure of a code contracting system according to the invention for cases where a serial representation of the messages is involved, FIG. 2 shows a detailed representation of the converters 2 and 4.

Figure 4:
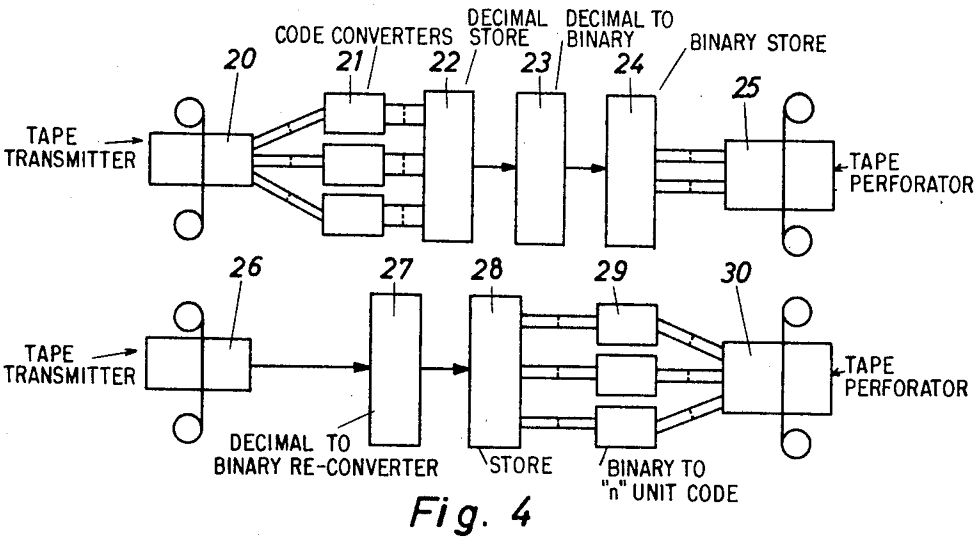
Figure 3:
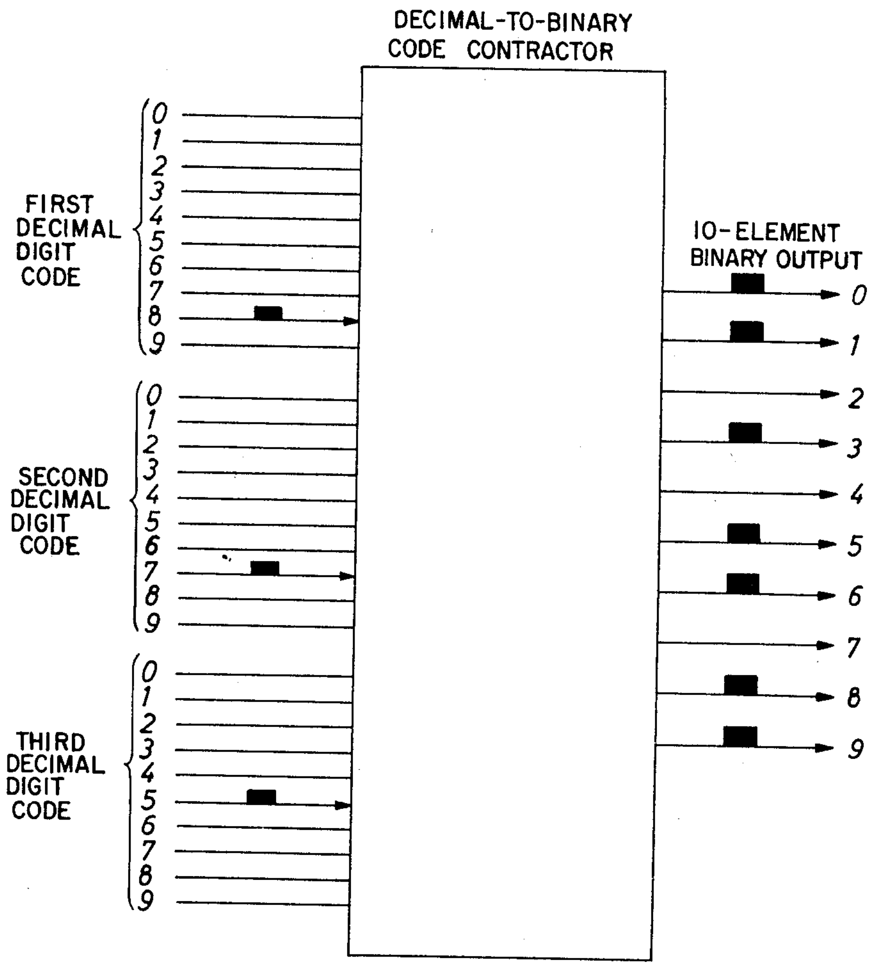
Figure 5:
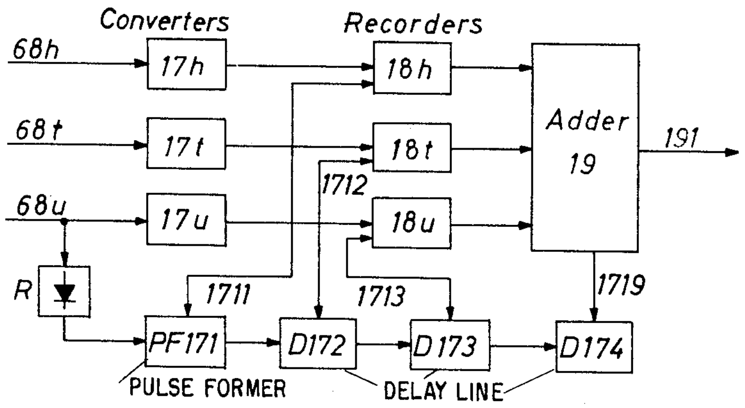
Figure 6:
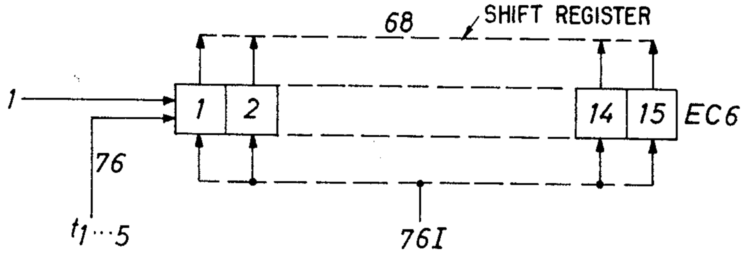
Figure 7:
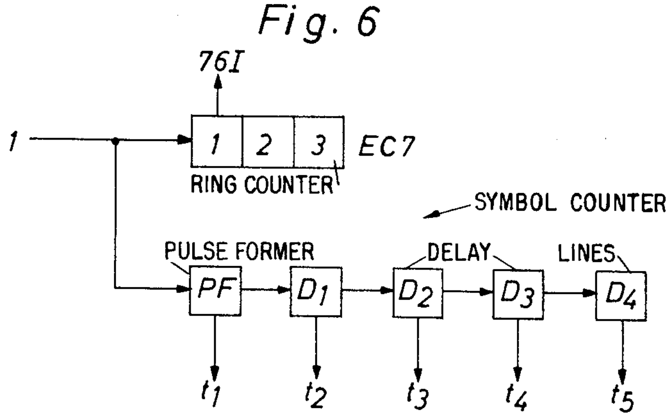

FIG. 3 shows a conversion arrangement at a pure parallel representation of the messages, FIG. 4 shows a code contracting arrangement for the case of transmitting figures via teleprinting channels, FIG. 5 is a more detailed showing of parts of the converter of FIGS. 1 to 4, FIG. 6 is a schematic showing of a typical symbol recorder or shift register, FIG. 7 is a schematic showing of a typical symbol counter.

FIG. 1 schematically shows the construction of a code contracting system for a pure serial representation, for example, in the five-unit code as used in the teleprinting technique, of the message to be transmitted. The message enters the converter 2 on the input line 1. In the converter 2 the groups of symbols of the message to be transmitted are converted into smaller groups of symbols and are then transmitted over the long-distance line 3 to the place of destination. At this receiving station the message is then passed through a re-converting device 4, in which the smaller groups of symbols are restored again to their original groups of symbols and depart the re-converting device via the output line 5. The input of the original message via the input line 1 to the converter 2, and the departure of this message from the re-converting device 4 via the output line 5 is appropriately effected at a higher speed per symbol than the transmission of the converted message on the long-distance line 3. The ratio of these speeds corersponds to the ratio of the number of symbols in the groups of symbols of the original message or of the converted message respectively, which correspond to each other.

In FIG. 2 there is shown a detailed representation of the converters 2 and 4. The transmitting end of the system consists of a symbol-storage device 6 which may be any well known memory device such for example as disclosed in U.S. Patent No. 2,838,745, of a symbol-counting device 7 which may be any well known ring counter such as described in chapter 3 of the book entitled "High Speed Computing Devices" by Engineering Research Associates, Inc., published by McGraw-Hill Book Company, Inc., 1950, of a converter 8, of a code-signal storage device 9 which may be any well known magnetic memory device and of the transmitter 10. The receiving end of the system consists of a code-signal storage device 11, of a re-converting device 13, of a symbol-storage or memory device 14, of a code-signal counting device 12 and of a receiver 15. The code-signal storage device 11 is connected with the long-distance transmission line 3.

Let it be assumed that the symbols arriving on the input line 1 are represented by the International Teleprinter Code in which, as is well-known, there are transmitted in series, one start pulse, five signal pulses, and one stop pulse per symbol. Connected with the input line 1 is the symbol-storage device 6 (also known as symbol recorder or shift register) and the symbol-counting device 7 (also known as symbol counter). In the symbol recorder 6 is contained a 15-digit pattern-movement or shift register as—when disregarding the number of digits—is well known in automatic computing machines. Such pattern-movement registers can be designed or laid-out to be readable either in series or in parallel. A suitable shift pattern register for this purpose is shown in the patent to A. D. Odell, No. 2,649,502, issued August 18, 1953. With respect to the cooperation with the converter 8, which will be described hereinafter, the pattern-movement register as contained in the symbol recorder 6 of the embodiment in consideration, is assumed to be a parallel-readable one. For the recording of binary signals + and − or 0 and 1, and for the prompt actuation of such a pattern-movement register there are provided two input lines (see FIG. 6), of which the first one serves the selection of the binary signals, while the second line serves to receive the stepping pulses. To this first line there is connected the input line 1, the electrical condition of which, however, is only read when stepping pulses are being sent over the second line. These pulses are being fed in the symbol recorder 6 (see FIG. 6) via line 76 from the symbol counter 7 (see FIG. 7).

The symbol counter or counting device 7 comprises any well known ring-type counter for counting the start pulses, and a delay-line for producing five signal pulses per start pulse. Since it is the problem in the present example to convert a group of three symbols (comprising 15 bits) into a smaller group of two symbols (comprising 10 bits), the employed ring-counter is of the three-stage type. It is pointed out, however, that this ring-counter must only be responsive to the start pulses.

In FIGS. 6 and 7 there is respectively shown an example of embodiment relating to the blocks 6 and 7 with respect to the serial-parallel conversion. FIG. 6 shows an exemplified embodiment for the symbol recorder 6, operating as a serial-parallel type converter and designed as a pattern movement register. The pattern-movement register EC6 according to FIG. 6 comprises 15 units, permitting a disoperated and an operated condition or state. The unit EC61 is provided with two input lines 1 and 76. Depending on whether the one or the other of two potentials is applied to line 1 there is recorded in the unit EC61 either a binary digit 0 or 1, when a stepping pulse T1 . . . 5 is transferred via line 76. By way of each stepping pulse the binary digits, as stored in the units of the recorder EC6, are transferred to the next higher units. If, for instance, in the unit EC613 there had been stored a binary 1, and if a new stepping pulse is being transferred via line 76, then the binary 1 will be transferred from the unit EC613 to the unit EC614. At the same time also all other binary digits, which are stored in the recorder, are likewise shifted by one position to the right, and a new binary digit is taken up in the unit EC61 according to the potential applied to line 1. If, at the beginning of a storage or recording process all units of the recorder EC6 were in the erased state then, after 15 stepping pulses, all of the 15 units of the recorder are written full. Subsequently to the 15th stepping pulse a transmission pulse is applied to all units of the recorder via line 76I. By the action of this pulse all of the operated units of the recorder will be disoperated and each unit of the recorder, that has been converted from the operated to the disoperated condition, will send out a pulse to the converter 8 via the corresponding one of the fifteen lines 68.

For producing the stepping pulses there are provided according to FIG. 7 a pulse shaping device PF and 4 delay-line members D1 to D4 which, at equal time-intervals, effect the transmission of the stepping pulses T1 . . . T5. The pulse shaper PF is designed in such a way as to be only responsive to those start pulses, which are applied via line 1. For producing the transmission pulses there is provided a ring counter EC7. As will be seen from FIG. 7, the device EC7 is composed of 3 units. These are likewise capable of providing a disoperated and an operated condition, and are arranged in such a way that always only one of them is operated. Upon transmitting start pulses via line 1 the respectively operated unit will become disoperated and the next successive one operated, whereby the operating of unit EC73 will be followed again by the operating of unit EC71. Upon operating the unit EC71 a transmission pulse is sent over line 76I, in other words, every third start pulse releases a transmission pulse.

For enabling a better understanding of the cooperation between the symbol recorder 6 and the counter 7, there will now follow a detailed description of the individual operating stages.

The pattern-movement register of the symbol recorder 6 is assumed to be in the erased state when in the normal position, while the symbol counter is in position III (not shown). It be assumed that over line 1 there is fed-in the number 875 in binary coded form, i.e. in the sequence 8, 7 and 5. Thus, when designating + by 0 and — by 1, the following train of pulses will result at line 1:

Start 1 0 0 1 1 Stop Start 0 0 0 1 1
Stop Start 1 1 1 1 0 Stop

The first start pulse effects the setting of the ring counter of the symbol counting device 7 to position I. At each transition from position III to position I this ring counter will transfer a transmission pulse to all 15 places of the pattern-movement register in the symbol recorder 6, the action of which will be described hereinafter. At the same time the start pulse excites the delay-line of the symbol counter, whereupon this delay-line successively transmits 5 stepping pulses (signal pulses) to the pattern-movement register.

By means of each of said stepping pulses there is read one teleprinter signal that is offered on line 1. Of course, the time delay between the stepping pulses is adapted to the frequency of the teleprinter signals. After the fifth stepping pulse the pattern-movement register has the setting 1 1 0 0 1 0 0 0 0 0 0 0 0 0 0

The stop pulse arriving after the five signal pulses remains without effect upon the circuits 6 and 7. The second start pulse effects a switching of the ring counter from position I to position II and, at the same time, energizes the delay-line, so that the latter again transfers five stepping pulses to the pattern-movement register in the symbol recorder 6. Since with the second signal the figure 7 is delivered by the signal pulses 0 0 0 1 1 via line 1, the pattern-movement register, at the end of the five stepping pulses of the second signal, will assume the position 1 1 0 0 0 1 1 0 0 1 0 0 0 0 0

By the third start signal the same process will be released again, during which now the figure 5 is taken up by the pattern-movement register as the last figure, so that this register will assume the position 0 1 1 1 1 1 1 0 0 0 1 1 0 0 1

By means of the next start signal the ring counter is again shifted from position III to position I, and the above-mentioned transmission pulse is transmitted to all 15 places of the pattern-movement register. This transmission pulse is fed via the 15 lines 68 to the converter 8. During this process the pattern-movement register is erased; of course the erasing has to take place prior to the end of the start signal, which can be easily accomplished, because the duration of the start signal amounts to one-and-a-half times that of the signal pulses.

Instead of the circuits 6 and 7 there may also be used any other conventional type of serial-parallel converter which, in accordance with the present example, is designed for 15 bits.

The mode of operation of the converter 8 will be described hereinafter in connection with FIG. 3. The converter 8 is adapted to convert the group of symbols represented by 15 bits into a group represented by only 10 bits, and effects the transfer of these 10 bits via the 10 lines 89 to the recorder or storage device 9. As a recorder 9 there may be used any static type of storage, or memory device, such as a ferrite or ferro-electric storage device, or the like. However, this recorder has to be of such a design as to be erased when the reading-out is effected. Although this recorder 9 is so arranged as to permit the parallel writing-in, the reading-out will be effected in series. The conversion from the parallel to the serial representation is performed by the transmitter 10. Via the 10 lines 910 the transmitter carries out a successive scanning of the 10 bits stored in the recorder 9, in the course of which it automatically inserts the corresponding start and stop pulses. For this reason also the 10 bits are being read in two successive groups of 5 bits each. These pulse groups are transferred via the trunk line 3 and are later on decoded again in the converter 4.

The re-converter 4 is composed of the circuits 11–15. In this case 12 again denotes a symbol counter which, however, is only of the two-stage type and is adapted to control the reception of the signal pulses in the symbol recorder. The symbol recorder 11 comprises a 10-digit pattern-movement register, that is capable of being read-out in parallel. Via 10 lines 1113 the contents of the recorder 11 is fed to the re-converter, the mode of operation of which will likewise be described hereinafter. This converter 13 delivers in parallel via 15 lines 1314 respectively 3 symbols to the symbol recorder 14, which is serially read-out by the receiver 15.

By way of example, the conversion may be carried out in such a way that each time 3 symbols of the five-unit code form one group. In cases where only figures are transmitted this group will represent a three-digit decimal number. The decimal number may be represented by a ten-digit dual or binary number, because with a ten-digit binary number there may be represented 1024 signals. Finally this binary number is divided in two halves, so that each part contains five signals, thus obtaining again a five-unit code. Thus the group with three symbols has been changed to a group with two symbols. Actually, the conversion from three to two symbols represents an optimum solution, because a three-digit decimal number can be represented by a ten-digit binary number, and the latter can be divided in two halves. On the other hand this reduction is only possible when there appear less signals than the available code is capable to represent. If, in the present example, all signals of the five-unit code were utilized then three symbols could no longer be assembled to form a three digit number. As is evident from the above, this code-contracting method will bring about a saving in time of 33⅓%.

One of the most important component parts of the converter 8 is the code contractor according to FIG. 3. The mode of operation of the code contractor will be described by way of example in connection with the transmission of the number 875. Each digit is represented by 5 code elements capable of representing respectively two values. The group of each set of 5 code elements is termed herein as a symbol. The symbol for the figure 8 is −++−−, the symbol for the figure 7 is +++−−. If a number, e.g. the number 875, is composed of individual figures, then there will result a "group of symbols" which, in the example under consideration, consists of 15 code elements. The three "Symbols" are as follows:

| (I) | First symbol | Second symbol | Third symbol |
|---|---|---|---|
| | −++−− | +++−− | −−−−+ |

The three symbols of the five-unit code (in this case of the teleprinting code) form one group. In the present example this group represents the number 875. If it is now being arranged that only figures are supposed to be transmitted then each such "Group" composed of three "Symbols" represents a three-digit decimal number. As is outlined already, this decimal number can be represented by a 10-digit binary number, because it is possible to represent 1024 different numbers by permuting a 10-digit binary number. On the other hand, for the representation of 10-digit dual numbers there are merely required 10 code elements which, in accordance with the binary digits 0 and 1, are respectively capable of representing two values each. In the binary number system the number 875 of the above-mentioned example is represented by the following sequence of figures:

1 1 0 1 1 0 1 0 1 1

This sequence of figures is now divided in two "Symbols" of five figures each, and to the figure 1 there is allotted the characteristic +, while the characteristic − is allotted to the figure 0.

In this way there will result a "smaller group of two symbols."

| (II) | First symbol | Second symbol |
|---|---|---|
| | ++−++ | −+−++ |

By converting the number 875 from the decimal to the binary number system the "larger group of symbols" consisting of three symbols will be reduced to a "smaller group of symbols" which is composed of two symbols only.

In this connection it is pointed out that in this case the "messages" are delivered in the normal teleprinting code. In the discussed example only figures are permitted as messages or informations, i.e. the figures 0 through 9. When decoding thus the individual messages represented by code words with five code elements each, then there will be obtained a one-out-of-ten code (1 out of 10).

In a similar sense also the FIG. 3 of the application should be understood, showing three groups of lines 0 through 9 at its left-hand input. These groups of lines are successively allotted from above to below to respectively the first, second and third symbol. For enabling a still better understanding of the invention in FIG. 3 there is shown on the left-hand side an input with altogether 30 lines in groups of ten, and which respectively correspond to one symbol. With respect to the mode of operation of the code contractor according to FIG. 3 there will be given in the following the example describing the transmission of the number 875.

In an already prepared stage of the process the number 875, delivered as the "larger group of symbols" according to the representation (I), will be decoded. The first symbol will then deliver an input pulse on line 8 of the first group of lines, the second symbol will deliver an input pulse on line 7 of the second line-group, and the third symbol will deliver an input pulse on line 5 of the third group of lines, as may be seen from the showing of the enclosed sketch. Subsequently to the decoding there will then be effected the feeding to the code contractor (FIG. 3) in a "1 out of 10" code. The code contractor will then convert the thus fed-in 3-digit decimal number into a 10-digit binary number. The output lines of the code contractor are designated, in accordance with the positional values $2^0$ through $2^9$ of the binary number, with 0 through 9 respectively. For each place or position of the binary number, whose digital value is 1, one output pulse will be sent over the output line, as will be seen from the sketch. The pulses, shown by way of example, represent the binary number 1 1 0 1 1 0 1 0 1 1

This number may then be transmitted as the "small group of symbols," in the present example, in the form of representation (II).

The decoding of the conventional or classical teleprinter code and the new coding to form the binary number as effected in the code contractor (FIG. 3) can be carried out with the conventional means as known from the fields of telecommunication and automatic computing machine technique, and, therefore, does not require any further explanation.

After having particularly described the operations to be carried out in the converter 8, there will now be given a description of the design or construction of the converter, and of the performance of the individual steps of operations. Of course, it is possible to start out at first from the representation of the digits in the five-unit code of the teleprinter code and then to change-over to the decoded representation in the 1 out of 10 code, and to carry out, finally, a new coding in the binary manner as provided for on principle in FIG. 3. However, since at a direct code-conversion from the five-unit code to binary numbers there can be used a more simpler construction it is appropriate to design the converter 8 in accordance with FIG. 5. As already mentioned in the foregoing, the symbol recorder 6 and the converter 8 are connected with each other by the 15 channels 68. Respectively five of these relate to one digit. Accordingly, in FIG. 5 the inputs for hundreds, tens and unit digits are shown separately and are denoted by **68*h*, 68*t* and 68*u* respectively. The five lines 68*h* lead to the code converter 17*h*, the five lines 68***t* to the code converter 17*t*, and the five lines 68*u*, finally, are led to the code converter 17*u*. As code converter there may be used any type of static converter, as is known from the electronic switching and automatic computing machine technique, so that there is not required any further detailed description. It should still be pointed out, however, that each of the code converters 17*u*, 17*t* and 17*h* is adapted to serve another problem. The code converter 17*u* for converting the unit digits into binary numbers—when regarding again the example of transmitting the number 875—receives, through the five code elements 1 1 1 1 0, which are simultaneously transmitted over the lines 68*u*, at its input the figure 5 and delivers to its output the binary number 0 1 0 1. Since for the representation of the unit digits there is required a maximum of 4 binary digits, the code converter 17*u* is provided with 4 output lines. To the code converter 17*t* the digit 7 is fed as the symbol 0 0 0 1 1 via the input channels 68*t*. Because in this case there is concerned the tens place or position, the number 70 has to be converted into a binary number. Accordingly, the code converter 17*t* reads out the binary number 1 0 0 0 1 1 0 at the output side. For representing the numbers 10, 20, 30 . . . 90 there is required a maximum of 7 binary digits. Accordingly, the code converter 17*t* is provided with 7 output lines.

To the code converter 17*h* there is fed via the input lines 68*h* the digit 8 in the form of a symbol 1 0 0 1 1. Since in this case there is concerned a figure of the hundreds position, the number 800 has been converted into the binary number 1 1 0 0 1 0 0 0 0 0. Consequently, the converter 17*h* requires 10 output lines.

The outputs of the code converters are connected with three corresponding recorders (registers or storage devices) 18*u*, 18*t* and 18*h*. Due to the fact that the code converters, as mentioned already hereinbefore, operate as static converters, the pulses, which are fed via the lines 68*u* through 68*h*, are practically received inertialess in a binary coded manner by the recorders 18*u* through 18*h*. With respect to the further processing, however, only the sum of the three binary numbers stored into the storages 18*u* through 18*h* is of interest. For producing or forming this sum there is provided an adder 19. To this end there may be employed any type of conventional accumulator as known from the computer technique, and to which the three binary numbers to be summed up are added or fed successively.

The feeding-in of the binary numbers is being controlled by a delay-line, consisting of the pulse shaper PF171 and delay-line members D172, D173 and D174. If at least one signal arrives on one of the lines 68*u* then, via a rectifier arrangement R (not shown), there will be interconnected the pulse shaper PF171 which, via the line 1711, transfers a read-out pulse into the recorder 18*h*, whereupon the contents of the storage is transferred to the adder 19. At the same time the pulse shaper PF171 transfers a signal to the delay-line member D172 which, via the line 1712, controls the recorder 18*t*, the contents of which is then likewise transferred to the adder 19. The delay-line member D172 also energizes the delay-line member D173 which, via line 1713, controls the last recorder 18*u*, so that also the contents of this recorder is transferred to the adder 19. The adder 19, which is designed as an accumulator, will then contain the sum of the three binary numbers, i.e. 1 1 0 1 1 0 1 0 1 1.

The delay-line member D173 also sends an impulse to the delay-line member D174, which is connected with the adder 19 via the line 1719 and is adapted to release the transmission of the aforementioned binary sum via 10 lines 191 into the recorder 9. By this the code contracting process is concluded; 10 binary digits can be read as a group of two symbols by the serially operating transmitter 10.

By way of example, this discussion of FIGS. 3 and 5 has shown the application of the code-contracting method to the parallel representation of the messages. Thereby, however, there is not shown one message in a parallel representation, but three parallel arriving different messages, each of which separately arriving in the one-out-of-ten code. From this example there are very clearly recognizable the advantages of the novel method. Normally there are required to this end three times ten lines. By employing the inventive method these 30 lines may be reduced to a total of 10, so that there is obtainable a saving in lines amounting to 66⅔%.

The three times ten lines, which are denoted 16, and coming from the three sources or message originating points, are introduced to the converter, consisting of the three input units 17 for each time ten input lines, and of the actual converter 18. The symbols of the messages arriving in the units 17 as three-digit numbers are converted in the converting device 18 into a ten-digit dual number which, in turn, is further transferred over the ten output lines 19. In this case there are also still saved special storage equipments as are required in the example according to FIG. 2. Of course it is a requirement that the conversion is carried so quickly as not to interfere with the transmission. On the receiving side there is provided the same converting device for performing the reverse functions, so that the receiving side does not need to be shown particularly in the drawing.

If from the three incoming messages respectively one only is supposed to be transmitted then, of course, special storage arrangements will have to be provided for the other two messages.

An example of practical application of the code contracting method, which is of a direct and particular interest to the practice, is shown in FIG. 4 of the drawings. It be assumed that the message to be transmitted only consists of figures, which are recorded with the customary five-unit code, in a recording means, for instance, a perforated tape. The message recorded in this way will be converted in accordance with the code contracting method and the thus converted message will again be recorded in a perforated tape. This perforated tape may then be used for transmission purposes. At the receiving end there will be produced the same perforated tape comprising the converted message, which then will be re-converted again into a perforated tape containing the original message.

At the transmitting side the system consists of a tape transmitter 20, which simultaneously senses three successive signals and transfers the 15 signal elements as read from the tape, as electrical impulses via three sets of five lines to the converters 21. In the converters there is effected a conversion of the digits represented in the five-unit code into digits of the one-out-of-ten code. Accordingly, these converters have ten output lines each, of which respectively one, that corresponds to a certain digit, is current-conductive. The three sets of ten output lines of the converters 21 lead to the storage device 22, in which the three successively following digits are stored in a decimal form. A preferably electronic converter 23 effects, in the conventional manner, a conversion of the three-digit decadic number, which is stored in the storage device 22, into a ten-digit binary number and transfers this number to the binary storage device 24. Since for the representation of a three-digit decimal number there is sufficient a maximum of ten binary digits, this storage device 24 only comprises ten output lines. These ten output lines lead to two five-unit groups of a tape perforating device 25, which is capable of receiving two sets of perforating signals at the same time and to punch them correspondingly into a recording tape.

This resulting perforated tape may now be used for the transmission purpose. If a normal type teleprinter transmission line is employed for the transmission then it is possible, in excess of the transmission path, to duplicate the perforated tape at the receiving station.

This duplicated perforated tape is sensed at the receiving station by the tape transmitter 26, that is, simultaneously in groups of respectively two signals of the five-unit code. These groups, respectively representing a ten-digit binary number, are at first re-converted in the converter 27 into the three-digit decimal representation in the one-out-of-ten code and are stored in this form into the storage device 28. The storage device 28 will then deliver its contents via the three converters 29, which carry out the re-conversion of the individual digits from the one-out-of-ten code into the five-unit code, and via the three times sets of five output lines to the perforating device 30 which respectively records 3 symbols of the five-unit code simultaneously in the perforated tape.

After having been subjected to a slight modification the system as shown in FIG. 4 of the drawings will also become suitable for the simultaneous transmission of a plurality of messages. Because when replacing on the transmitting side the triple tape transmitter 20 by three individual tape transmitters, and by the dual acting tape perforating device 25 by two simple type tape perforators, then there will be obtained from three different messages and from three different perforated tapes as the final product of the transmitting side two different perforated tapes, each of which comprising the same number of signals as the original tapes containing the message. These tapes, respectively the contents of these tapes, may then be transmitted over one or two teleprinting channels and can be duplicated at the receiving station. When replacing at the receiving station the dual-acting tape transmitter 26 by two synchronous individual transmitters, and when replacing the triple-acting tape perforator 30 by three individual tape perforating devices then it will be possible to recover or to re-obtain the original three messages.

In the case of teleprinting transmissions of the latter kind there are required as a rule, besides the code signals for the transmission of the contents of the message, still further code signals for tripping the various functions, such a carriage return, line feed, and the like. The production and the reception of such functional code-signals is easily possible within the scope of the described conversion, because a ten-digit binary number offers the possibility of representing 1024 different symbols. For the transmission of the three-digit decadic numbers there are only required 1000 code signals. Hence there still remain 24 code signals, or better: 24 pairs of code signals for representing the functional symbols.

Of course, the described method can also be employed in cases where e.g. the message is not supposed to appear again at the receiving side in the form of perforated tapes or in plain text. The inventive method appears to be of a particular advantage in cases where the message, subsequently to the transmission, is supposed to be converted into punched cards, because in this case it is then possible to directly connect a correspondingly designed card punching or perforating device to the storage device 28, whereby a repeated conversion of the one-out-of-ten code into the teleprinting code and back to the one-out-of-ten code, which is necessary for the punching of the cards, will become superfluous.

A further particularly advantageous practical application of the method of code contraction exists whenever the transmitted message is intended to carry out automatic computing operations. Because since, in accordance with the described methods the message, which is originally sent in the teleprinting code, appears binarily coded in groups of three digits each, it may be fed in this form directly to correspondingly constructed binarily operating computing machines.

While I have described above the principles of my invention in connection with specific apparatus, it is to be clearly understood that this description is made only by way of example and not as a limitation to the scope of my invention as set forth in the objects thereof and in the accompanying claims.

For a detailed description of the various components hereinabove referred to, such as shift registers, ring counters, decimal-to-binary converters, memory or storage units, reference may be had to "High Speed Computing Devices," by Engineering Research Associates, published by McGraw-Hill Book Company, Inc., 1950, and "Arithmetic Operations in Digital Computers," by R. K. Richards, published by D. Van Nostrand Company, Inc., 1955.

What is claimed is:

1. A system for transmitting intelligence symbols such for example as digits using an $n$-element permutation code wherein the total number of symbols requires a smaller number of respective permuted combinations than the total of permuted combinations of which the said code is capable, comprising means to translate each symbol into a respective code combination in said $n$-element code, means to group said combinations to form a number of "$a$" groups where "$a$" is an integer so as to form a total number of $(n \times a)$ signal elements for each group, means to convert and contract said $(n \times a)$ grouped elements into a corresponding binary coded group of $(n \times b)$ elements wherein "$b$" is an integer and less than "$a$," means to divide said contracted binary group into "$b$" groups of "$n$" elements per group, means to transmit said divided contracted groups by said $n$-element code, means to receive said transmitted contracted groups, means to reconvert said received groups of $(n \times b)$ elements into corresponding groups of $(n \times a)$ elements and an $n$-element code receiver connected for operation under control of the last mentioned reconverted $(n \times a)$ elements.

2. A system according to claim 1 in which the means to group said combinations to form the "$a$" groups of $(n \times a)$ signal elements per group, includes a shift register and a ring counter, the said counter having "$a$" stages and the said register having $(n \times a)$ stages.

3. A system according to claim 2 in which the means for converting said $(n \times a)$ grouped elements into said corresponding binary coded group of $(n \times b)$ elements comprises a decimal-to-binary code converter.

4. A system according to claim 2 in which the means for converting said $(n \times a)$ grouped elements into said corresponding binary coded group of $(n \times b)$ elements comprises a decimal-to-binary code converter having means to impress the decimal codes in parallel on its input to produce at a set of output terminals of the converter a corresponding set of $(n \times b)$ binary codes.

5. A telegraph transmission system comprising scanning means for simultaneously scanning "$a$" successive groups of tape perforations and for generating corresponding "$a$" groups of permuted signal elements in an $n$-element code, "$a$" sets of input conductors, marking means associated with said scanning means for marking respective sets of said input conductors in accordance with a decimal code corresponding to respective groups of generated signal elements, "$b$" sets of output conductors where "$b$" is an integer less than "$a$," a decimal-to-binary code converter for marking the said "$b$" sets of output conductors in accordance with a binary code corresponding to the decimal code markings on said "$a$" sets of input conductors, transmitting means for transmitting $n$-element signals corresponding to the binary code markings on said output conductors, receiving means for receiving said $n$-element signals and for converting them into a corresponding plural group decimal code wherein each group corresponds to a symbol being transmitted, and a telegraph tape receiver for receiving and recording said plural group decimal code.

6. A telegraph transmission system as set forth in claim 5 wherein the said tape perforations represent teleprinter 5-unit codes, and wherein the input and output conductor sets each contain *n* conductors where "*n*" is a decimal digit.

References Cited in the file of this patent

UNITED STATES PATENTS

| | | |
|---|---|---|
| Re. 23,713 | Hunt | Sept. 22, 1953 |
| 2,471,126 | Spencer | May 24, 1949 |
| 2,620,878 | Rabenda | Dec. 9, 1952 |
| 2,637,017 | Holden | Apr. 28, 1953 |
| 2,647,689 | Bowyer | Aug. 4, 1953 |
| 2,657,856 | Edwards | Nov. 3, 1953 |
| 2,706,215 | Van Duuren | Apr. 12, 1955 |
| 2,708,267 | Weidenhammer | May 10, 1955 |
| 2,724,739 | Harris | Nov. 22, 1955 |
| 2,811,713 | Spencer | Oct. 29, 1957 |
| 2,878,313 | Tolson et al. | Mar. 17, 1959 |